O. G. HITCHCOCK.
ADJUSTABLE MIXING FAUCET.
APPLICATION FILED APR. 14, 1922.
1,425,478. Patented Aug. 8, 1922.
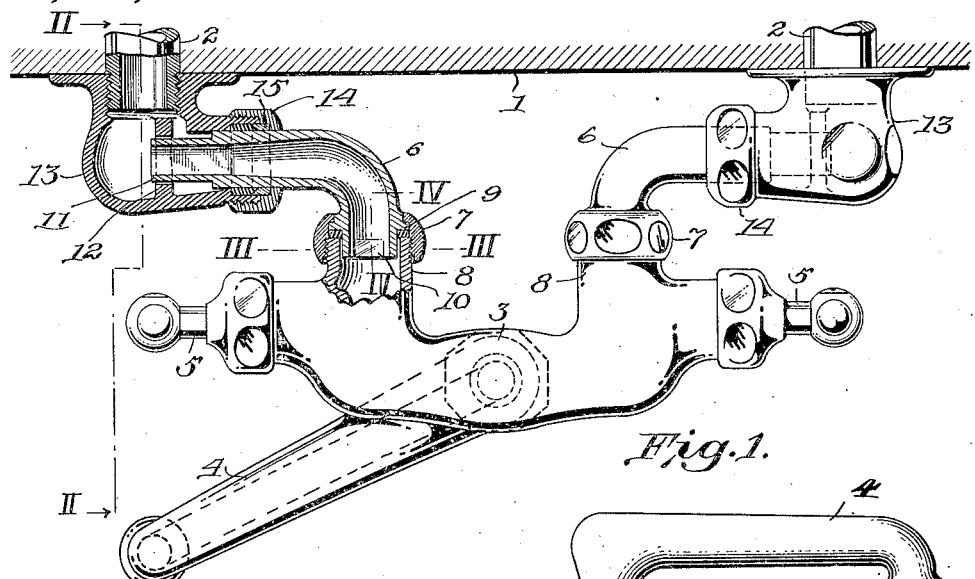
Fig. 1.
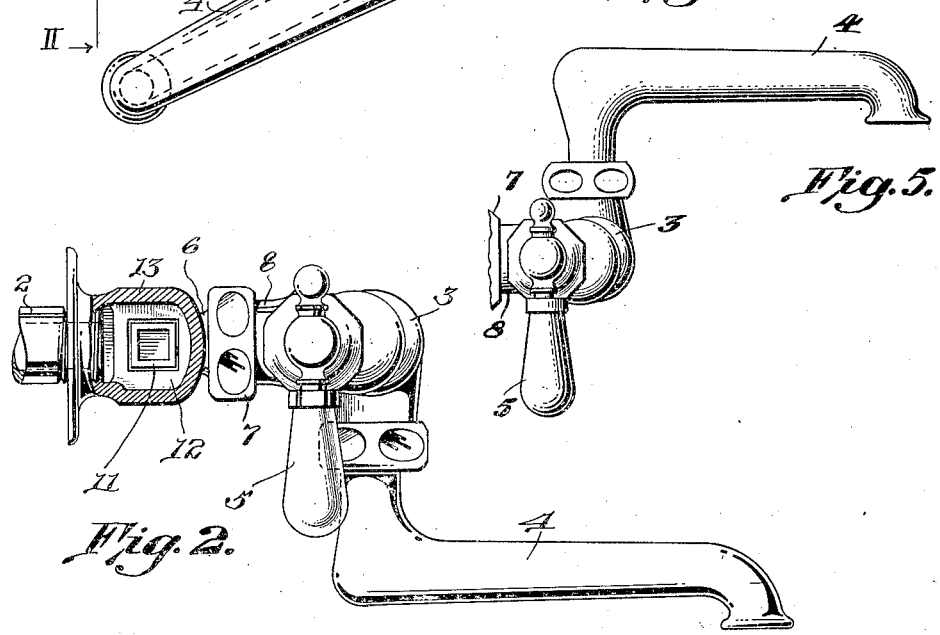
Fig. 5.
Fig. 2.
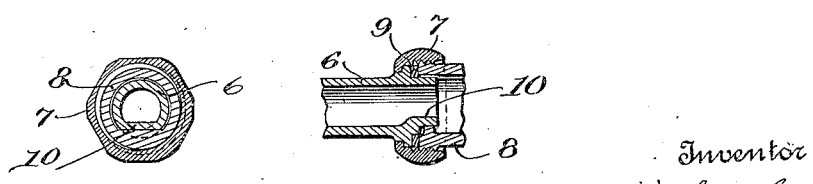
Fig. 3. Fig. 4.
Inventor
Otto G. Hitchcock
by Percy B. Hills
Attorney

UNITED STATES PATENT OFFICE.

OTTO G. HITCHCOCK, OF ERIE, PENNSYLVANIA, ASSIGNOR TO HAYS MANUFACTURING CO., OF ERIE, PENNSYLVANIA, A CORPORATION OF PENNSYLVANIA.

ADJUSTABLE MIXING FAUCET.

1,425,478.  Specification of Letters Patent.  Patented Aug. 8, 1922.

Application filed April 14, 1922. Serial No. 552,708.

*To all whom it may concern:*

Be it known that I, OTTO G. HITCHCOCK, a citizen of the United States, residing at Erie, county of Erie, State of Pennsylvania, have invented certain new and useful Improvements in Adjustable Mixing Faucets, of which the following is a specification.

My invention relates to combination mixing faucets, and has for its primary object to provide an improved means for adjusting the inlet arms thereof to accommodate variations in the distance between the hot and cold water supply pipes, to which said faucets are connected.

My invention also involves certain minor novel details of construction, as hereinafter more definitely will be pointed out and claimed, reference being had to the accompanying drawing, in which:—

Figure 1 is a top plan view of my improved faucet, shown attached to the supply pipes and partly broken away.

Figure 2 is a horizontal sectional view, taken on the line II—II of Figure 1.

Figure 3 is a detail sectional view, taken on the line III—III of Figure 1.

Figure 4 is a detail sectional view, taken on the line IV—IV of Figure 1.

Figure 5 is a detail side elevation of the mixing chamber and discharge nozzle, showing a slightly modified construction.

Similar numerals of reference denote corresponding parts in the several views.

In the said drawing, the reference numeral 1 denotes the wall of the building, through which projects the horizontal upper ends of the usual hot and cold water supply pipes 2, the same being exteriorly screw-threaded at their outer ends, as shown. As usually made, these combination faucets provide for a spacing of approximately eight inches between the pipes 2, but any variation in this distance necessarily requires a bending of said pipes 2 properly to receive the faucet, the same causing inconvenience and waste of time in making the fitting.

My improved faucet comprises the usual mixing chamber 3 and swinging discharge nozzle 4, the water supply thereto being controlled by the usual screw cocks 5 for the hot and cold water. Connected to the rear of the mixing chamber 3 upon opposite sides thereof are bent pipes 6 extending in opposite directions, each of said pipes being provided with a screw-threaded nut 7 adapted to engage a corresponding screw-thread on an extension 8 of the mixing chamber 3, a suitable packing 9 being interposed to prevent leakage when the parts are screwed to position. By reference to Figure 3, it will be seen that that portion of each of the pipes 6 entering its extension 8 is flattened on one side at 10 to correspond with a similar flattened portion on the interior of said extension, whereby all rotary movement of the parts with respect to each other effectually is prevented. The pipes 6 extend diametrically away from each other, and each at its outer end is squared at 11, as best seen in Figure 2, said squared end entering a similarly shaped opening in a partition 12 formed integral with a coupling 13, which in turn is in screw-threaded engagement with its pipe 2. Each of said couplings 13 is exteriorly screw-threaded at its inner end to receive a coupling nut 14 and interposed between said coupling and nut and the bent pipe 6 is a packing 15, which, when said coupling at 14 is screwed to position, will be forced against the exterior face of said bent pipe, thereby making a tight joint.

From this construction, it will be understood that the couplings 13 may be adjusted longitudinally upon the bent pipes 6 to vary their distance relative to each other, the engagement of the squared ends 11 of said bent pipes with the similarly shaped openings in the partitions 12 effectually preventing any rotary movement. Thus it will be seen that the couplings 13 can be adjusted toward and from each other to a considerable degree, even as much as an inch, and by then tightening up the nuts 14 a perfectly water-tight connection will be had, so that the fixture can be adjusted to accommodate comparatively wide variations in the distance between the supply pipes 2. The provision of the squared ends 11 and their engagement with the similarly shaped openings in the partitions 12 is important, in that otherwise the weight of the mixing chamber 3 and its parts together with the strain imposed in manipulating the handles of the screw cocks 5, would tend to rock the mixing chamber out of alinement, a result which this construction effectually prevents.

In assembling the device, the couplings 13 first are screwed to position separately upon the pipes 2, the bent pipes 6 then are inserted into said couplings and adjusted to register with the extensions 8, whereupon by tightening the nuts 7 and 14, a rapid and perfectly efficient assemblage of the device is effected.

By flattening one side of the pipes 6 at 10 to engage correspondingly shaped receiving portions in the extensions 8, and by squaring the other ends of said pipes 6 at 11 to engage similarly squared apertures in the partitions 12 in fittings 13, I effectually prevent any relative rotary movement of the parts, the only adjustment of the fittings 13 being longitudinal.

In Figures 1 and 2, I have shown the discharge nozzle 4 disposed beneath the mixing chamber 3, but in some instances it may be desired that a nozzle shall be disposed above said mixing chamber, as shown in Figure 5. This can be accomplished, and the same mixing chamber used, by simply reversing in said mixing chamber the interior screw-threads which operate the valves of the cocks 5. It will be understood that said cocks are opened by lifting their handles, which move the valves controlled thereby outwardly to permit the flow of water therethrough. When the mixing chamber 3 is reversed, in order to obtain the same operation of the cocks 5, their screw-threads must be reversed, as readily will be understood. It will be understoood that with this construction, in order that the nozzle may discharge downwardly, a nozzle 4' having its discharge end shaped as shown in Figure 5 will be employed.

Having thus fully described my invention, what I claim as new and desire to secure by Letters Patent, is:—

1. A mixing faucet, comprising a mixing chamber, a discharge spout therefor, fittings adapted to be attached to separate inlet pipes, and means connecting said mixing chamber and fittings permitting longitudinal adjustment therebetween but preventing relative rotary movement.

2. A mixing faucet, comprising a mixing chamber, a discharge spout therefor, fittings adapted to be attached to separate inlet pipes, bent pipes connecting said mixing chamber and fittings, said fittings being adjustable longitudinally toward and from each other on said pipes, and means preventing relative rotary movement between said fittings and pipes.

3. A mixing faucet, comprising a mixing chamber, a discharge spout therefor, fittings adapted to be attached to separate inlet pipes, bent pipes connecting said mixing chamber and fittings, said fittings being slidable on said pipes toward and from each other, partitions in said fittings having angled apertures therethrough in which the similarly shaped outer ends of said pipes pass to prevent relative rotation of the parts, and coupling nuts and packings between said pipes and fittings for clamping the parts water-tight in any adjusted position.

4. A mixing faucet, comprising a mixing chamber, a discharge spout therefor, fittings adapted to be attached to separate inlet pipes, bent pipes connecting said mixing chamber and fittings, said fittings being adjustable longitudinally toward and from each other on said pipes, and packing connections between said pipes and mixing chamber, said connections being angled to prevent relative rotary movement.

5. A mixing faucet, comprising a mixing chamber fittings adapted to be connected to separate inlet pipes, detachable connections between said chamber and fittings, and a set of discharge nozzles adapted to be detachably and pivotally connected to said chamber, said chamber being reversible to cause a discharge nozzle to project either from the under or the upper side of said chamber.

In testimony whereof, I hereunto affix my signature.

OTTO G. HITCHCOCK.